(12) United States Patent
Alexander et al.

(10) Patent No.: US 12,254,381 B1
(45) Date of Patent: Mar. 18, 2025

(54) QUANTUM-COMPUTING ARCHITECTURE BASED ON MULTI-DIMENSIONAL CONTINUOUS-VARIABLE CLUSTER STATES IN A SCALABLE PLATFORM

(71) Applicants: UNM Rainforest Innovations, Albuquerque, NM (US); University of Arizona, Tucson, AZ (US)

(72) Inventors: Rafael Alexander, Albuquerque, NM (US); Shuai Liu, Tucson, AZ (US); Bo-Han Wu, Tucson, AZ (US); Zheshen Zhang, Tucson, AZ (US)

(73) Assignee: UNM RAINFOREST INNOVATIONS, Albuquerque, NM (US)

( * ) Notice: Subject to any disclaimer, the term of this patent is extended or adjusted under 35 U.S.C. 154(b) by 585 days.

(21) Appl. No.: 17/467,886

(22) Filed: Sep. 7, 2021

Related U.S. Application Data

(60) Provisional application No. 63/075,234, filed on Sep. 7, 2020.

(51) Int. Cl.
*G06N 10/40* (2022.01)
(52) U.S. Cl.
CPC ................... *G06N 10/40* (2022.01)
(58) Field of Classification Search
CPC ............... G06N 10/20; G06N 10/40
See application file for complete search history.

(56) References Cited

U.S. PATENT DOCUMENTS

| | | | |
|---|---|---|---|
| 2018/0341874 A1* | 11/2018 | Puri | G06N 10/00 |
| 2019/0049495 A1* | 2/2019 | Ofek | G01R 33/1284 |
| 2020/0372334 A1* | 11/2020 | Carolan | G06N 3/088 |
| 2024/0070504 A1* | 2/2024 | Larsen | G06N 10/20 |

OTHER PUBLICATIONS

"Route to stablilized ultrabroadband microresonator-based frequency combs", Michael R. E. Lamont, Yoshitomoto Okawachi, and Alexander L. Gaeta, @2013 Optical Society of America.*

* cited by examiner

*Primary Examiner* — Nha T Nguyen
(74) *Attorney, Agent, or Firm* — Valauskas Corder LLC

(57) ABSTRACT

A scalable platform for generating time-frequency-multiplexed cluster states and utilizing them for large-scale quantum computing. Kerr microcombs and continuous-variable (CV) quantum information are used to formulate a one-way quantum computing architecture that can accommodate hundreds of simultaneously addressable entangled optical modes multiplexed in the frequency domain and an unlimited number of sequentially addressable entangled optical modes in time domain. One-dimensional, two-dimensional, and three-dimensional CV cluster states can be deterministically produced using robust integrated photonic circuit technology is leveraged that is readily available and experimentally viable.

9 Claims, 7 Drawing Sheets dual-rail encoding on single photons, has been theoretically studied and verified in proof-of-concept experiments. Scaling up the size of DV cluster states, however, is impeded by a lack of deterministic means for their generation. A mainstream mechanism to produce DV cluster states based on spontaneous parametric down-conversion (SPDC) in non-linear crystals followed by non-deterministic post-selection suffers from an exponentially small state-generation success rate as the size of the DV cluster state increases.

QUANTUM-COMPUTING ARCHITECTURE BASED ON MULTI-DIMENSIONAL CONTINUOUS-VARIABLE CLUSTER STATES IN A SCALABLE PLATFORM

CROSS-REFERENCE TO RELATED APPLICATIONS

This application claims the benefit of U.S. Provisional Application No. 63/075,234, filed on Sep. 7, 2020, all of which is incorporated by reference.

STATEMENT REGARDING FEDERALLY SPONSORED RESEARCH OR DEVELOPMENT

This invention was made with government support under PHY1630114 awarded by National Science Foundation (NSF) and under N00014-19-1-2190 awarded by Office of Naval Research. The government has certain rights in the invention.

FIELD OF THE INVENTION

The invention is directed to quantum computing and more specifically to a one-way quantum-computing architecture based on large-scale cluster states.

BACKGROUND

Quantum computing is a disruptive paradigm widely believed to be capable of solving classically intractable problems such as factoring big numbers, data fitting, combinatorial optimization, and boson sampling. The development of quantum-computing platforms has significantly progressed over time; However, there remains immense challenges associated with the scalability of the platform, the connectivity of qubits, and the required fidelity of various components.

One-way quantum computing is an approach to obviate the demanding requirement on quantum-gate fidelity. Unlike quantum-computing schemes based on quantum gates, the quantum logic in one-way quantum computing is implemented via measuring a highly entangled state known as a cluster state. Measurements are implemented sequentially, so that the measurement basis at a given step may be adaptively chosen based on outcomes of prior measurements. Thus, given access to high quality entangled resource states and high-fidelity measurements, the need for active quantum gates is eliminated. Cluster states are an important ingredient for one-way quantum computing, and a compact, portable, and mass producible platform for large-scale cluster states is essential for the widespread deployment of one-way quantum computing.

One-way quantum computing can be implemented in different platforms, and is particularly well suited to quantum-photonic architectures because: first, photons are robust quantum-information carriers even at room temperature; second, quantum measurements on photons are well developed (they can be precisely controlled and efficiently read out); and third, photons can be readily transmitted over long distances to link distributed quantum-computing and quantum-sensing devices with-out requiring extra quantum-information transductions.

A barrier to photonic one-way quantum computing, however, lies in the generation of large-scale, high-quality cluster states. Photonic one-way quantum computing based on discrete variable (DV) cluster states, typically based on dual-rail encoding on single photons, has been theoretically studied and verified in proof-of-concept experiments. Scaling up the size of DV cluster states, however, is impeded by a lack of deterministic means for their generation. A mainstream mechanism to produce DV cluster states based on spontaneous parametric down-conversion (SPDC) in non-linear crystals followed by non-deterministic post-selection suffers from an exponentially small state-generation success rate as the size of the DV cluster state increases.

Continuous variable (CV) states are encoded into continuous quadratures of bosonic modes. Like DV systems, super dense coding, quantum teleportation, and quantum cryptography have been demonstrated in CV systems. Moreover, one-way quantum computing can also be generalized to CVs. And large-scale entangled states can be deterministically generated at a large scale. Indeed, CV-cluster-state sources have been studied in the frequency domain and the time domain. A recent experiment of frequency-multiplexed CV cluster states demonstrated 60 simultaneously accessible spectral modes. In the time domain, temporal modes can be addressed sequentially, enabling demonstrations of cluster states made of 10,000 modes and over one-million modes. Though large in scale, the aforementioned demonstrations all generated one-dimensional cluster states, which are insufficient for universal one-way quantum computing.

Two-dimensional time-multiplexed CV cluster states can be generated, but the utility of such 2D CV cluster states in one-way quantum computing is constrained by the shorter of the two dimensions. Extending this dimension comes at the price of potentially introducing additional losses, limiting the potential scalability of time-multiplexing in more than one dimension. Hybrid time-frequency multiplexed CV cluster states would significantly enlarge the size of the shorter dimension, but obtaining phase references to simultaneously access all spectral modes remains an outstanding open problem.

A key factor in assessing the feasibility of fault-tolerant measurement-based quantum computation is the amount of squeezing available in a CV cluster state. The amount of required squeezing depends on the form of error correction used. Recent work has highlighted the possibility of using a combination of robust bosonic qubits, known as the Gottesman-Kitaev-Preskill (GKP) encoded qubits, and 3D entangled structures to implement fault-tolerant quantum computation. While the former have recently been demonstrated experimentally, the latter still presents a challenge. As such, a platform that generates 3D CV cluster states would be an enabler for fault-tolerant quantum computing.

What is needed is a quantum-computing architecture, and further based on large-scale multi-dimensional continuous-variable cluster states. The invention satisfies this need.

SUMMARY

A scalable platform for generating time-frequency-multiplexed cluster states and utilizing them for large-scale quantum computing. Kerr microcombs and continuous-variable (CV) quantum information are used to formulate a one-way quantum computing architecture that can accommodate hundreds of simultaneously addressable entangled optical modes multiplexed in the frequency domain and an unlimited number of sequentially addressable entangled optical modes in time domain. One-dimensional, two-dimensional, and three-dimensional CV cluster states can be deterministically produced using robust integrated photonic circuit technology is leveraged that is readily available and experimentally viable.

The architecture according to the invention utilizes third-order ($\lambda^{(3)}$) Kerr nonlinearity with both time and frequency multiplexing to produce reconfigurable 1D, 2D, or 3D CV cluster state. Frequency multiplexing can provide access to hundreds of simultaneously accessible, highly-connected spectral modes, whereas the time multiplexing allows for sequential access to an unlimited number of temporal modes. By virtue of large bandwidth (~GHz) of the spectral modes, the quantum-photonic platform offers the scalability and robustness required to produce large-scale 3D CV cluster states for fault-tolerant quantum computing.

A unique advantage of the invention—which uses $\lambda^{(3)}$) Kerr nonlinearity—is that a frequency-comb soliton can be generated that is suitable for acting as a local phase reference for all spectral modes, thereby solving a key challenge that faced previous work on frequency-multiplexed CV cluster states. Access to a large number of spectral modes enables a scale required to see a truly 3D structure, without introducing prohibitively high loss. The invention provides many advantages: (1) only constant length delay lines are required to grow the resource state in the time direction; 2) and frequency multiplexing can be employed to extend the state in the frequency domain, and it is possible to address a large number spectral modes via a frequency-comb soliton local oscillator.

Furthermore, the invention provides an architecture with the benefit that it can be reprogrammed to generate cluster states of dimensions less than three. This makes it compatible with previously studied protocols for lower dimensional cluster states. Unlike previous schemes for the generation of 2D cluster states, the invention is capable of producing 3D cluster sates because known fault-tolerant error correction schemes, such as topological error correction strategies.

Silicon photonics is a preferred scalable platform for the invention. According to one embodiment, the key components of the proposed integrated silicon nitride quantum computing platform include on-chip MRs, waveguides, MMIs, crossings, and DLs.

The present invention and its attributes and advantages will be further understood and appreciated with reference to the detailed description below of presently contemplated embodiments, taken in conjunction with the accompanying drawings.

DETAILED DESCRIPTION

The invention is directed to a one-way quantum-computing architecture based on large-scale 3D CV cluster states generated in a scalable platform, e.g, a quantum-photonic platform. The one-way quantum-computing architecture is formulated using two distinct fields, Kerr-soliton microcombs and CV quantum information.

Figure 1A:
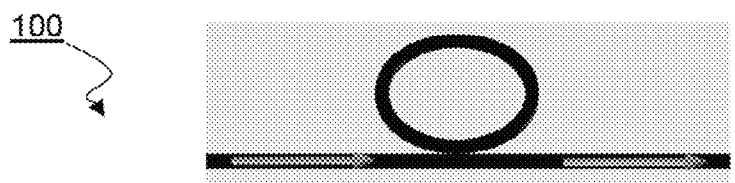
FIG. 1A illustrates frequency-comb generation.

FIG. 1A illustrates frequency-comb generation 100, i.e., a continuous-wave (CW) pump field is sent through a bus waveguide and coupled into a microring resonator (MR).

Figure 1B:
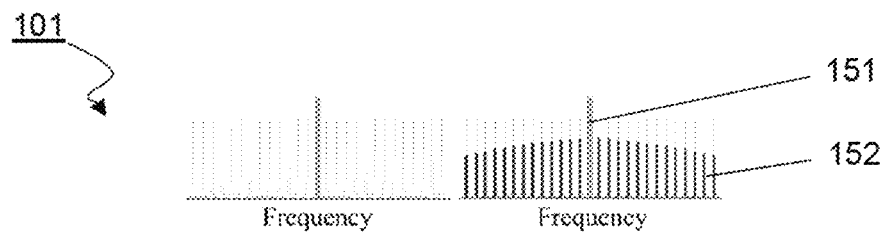
FIG. 1B illustrates a spectra graph.

The power of the in-coupled field is greatly enhanced by an appropriate quality (Q) factor of the MR. Above the parametric oscillation threshold, side-mode fields are created via four-wave mixing (FWM). The generated side-mode fields 152 then couple with the pump field 151 to create more side-mode fields via stimulated FWM as shown in FIG. 1B.

Moreover, provided that the power of the generated side-mode fields 152 are above the cavity threshold, they also serve as new pump sources that, in turn, generate other side-mode fields. This cascading FWM process leads to an extensively-extended spectrum profile 101, as shown in FIG. 1B. Locking the phase of each frequency tooth leads to the generation of a Kerr-soliton, which addresses the corresponding spectral mode of the CV cluster state in coherent quantum measurements.

According to the invention, zero-, one-, two-, and three-dimensional CV cluster states can be generated by sending a CW pump field, whose power is below the parametric oscillation threshold, through the configuration described with respect to FIG. 1A and FIG. 1B. Choosing an input pump power level below the cavity oscillator threshold brings multiple benefits. First, operating at a lower power level is more energy efficient; second, thermally-induced instabilities are reduced; and third, the mean fields of the quantum modes would otherwise be very large above the oscillation threshold, creating a barrier to quantum-limited homodyne detection.

According to one embodiment, a programmable photonic platform is used to switch between generating a variety of different CV cluster states with different dimensions simply by tuning the phase of a Mach-Zehnder interferometer (MZI). The MRs are pumped at even spectral modes while detecting the output fields at only odd modes.

Figure 2A:
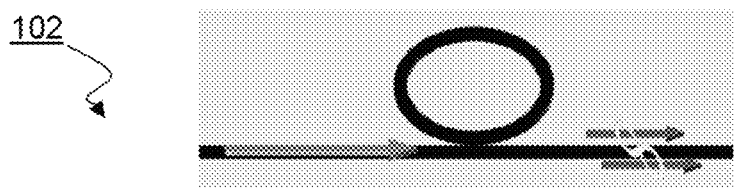
FIG. 2A illustrates frequency comb generation of a 0D cluster state.
Figure 2B:
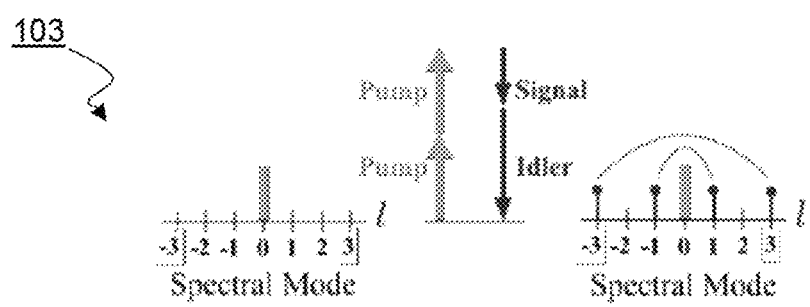
FIG. 2B illustrates a four-wave mixing process in a microring resonator.
Figure 2C:
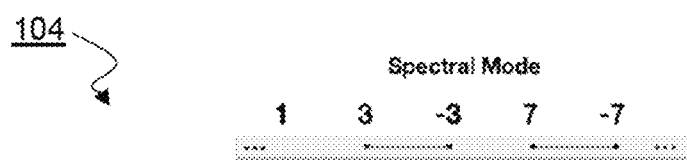
FIG. 2C illustrates a graph of the output state.

The FWM process couples different cavity spectral modes, creating side-mode fields in a pair-wise fashion. A frequency-comb generation of a 0D cluster state 102 is shown in FIG. 2A. FIG. 2B illustrates a four-wave mixing process 103 in a microring resonator. As shown in FIG. 2B, pairs of pump photons at spectral mode l=0 are converted into signal photons at spectral mode $-l=-1, -3, -5$ . . . and idler photons at spectral mode $l=1, 3, 5, \ldots$ These modes become entangled with each other. More specifically, they become two-mode squeezed states, which are equivalent to two-mode CV cluster states via application of local phase shifts. FIG. 2C illustrates a graph 104 of the output state.

Figure 3:
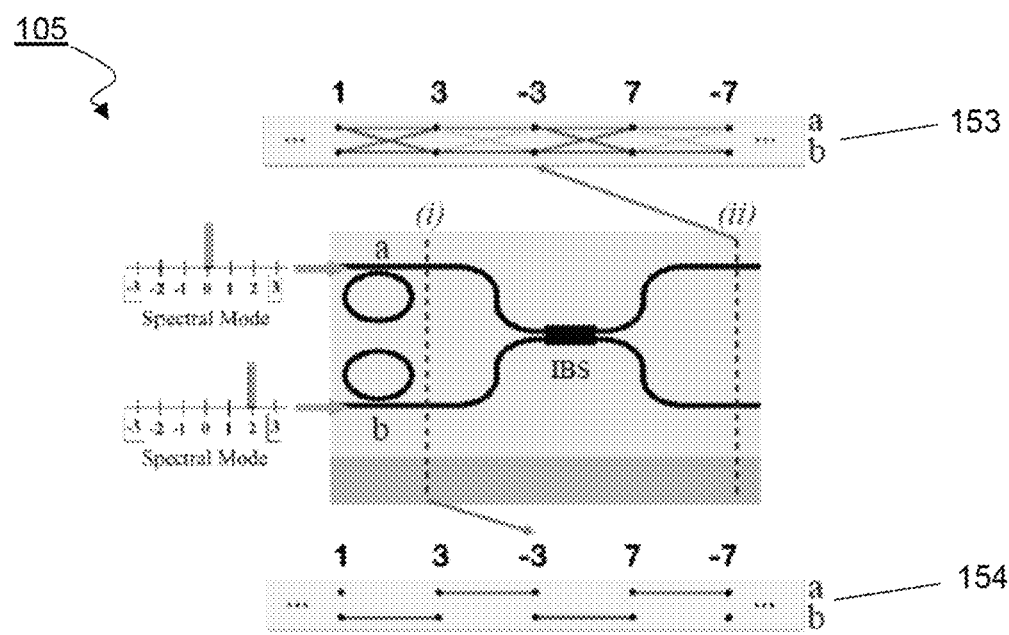
FIG. 3 illustrates frequency comb generation of a 1D cluster state.

FIG. 3 illustrates a 1D cluster state 105. To configure a 1D CV cluster state, two identical sets of 0D configurations are connected by a 50:50 integrated beamsplitter (IBS). This IBS is designed so that it is capable of coupling the fields across a wide-frequency range. The two MRs are pumped at different cavity spectral modes: spatial mode 'α' is at l=0 and 'b' is at l=2. The frequency offset of these two pumps results in each frequency being connected by an entangled pair to its neighbor, as shown in stage (i) of FIG. 3. A one-dimensional entangled CV cluster state is produced in the frequency domain, as shown in stage (ii) of FIG. 3. This is known as the dual-rail wire and is a resource for single-mode CV one-way quantum computing. The top and bottom inserted panels 153, 154 of FIG. 3 depict the graph-state representations right after stage (i) and (ii). The top panel 153 is for spatial mode 'α', and the bottom panel 154 is for spatial mode 'b'. C=1 for stage (i) and C=½ for stage (ii).

Figure 4:
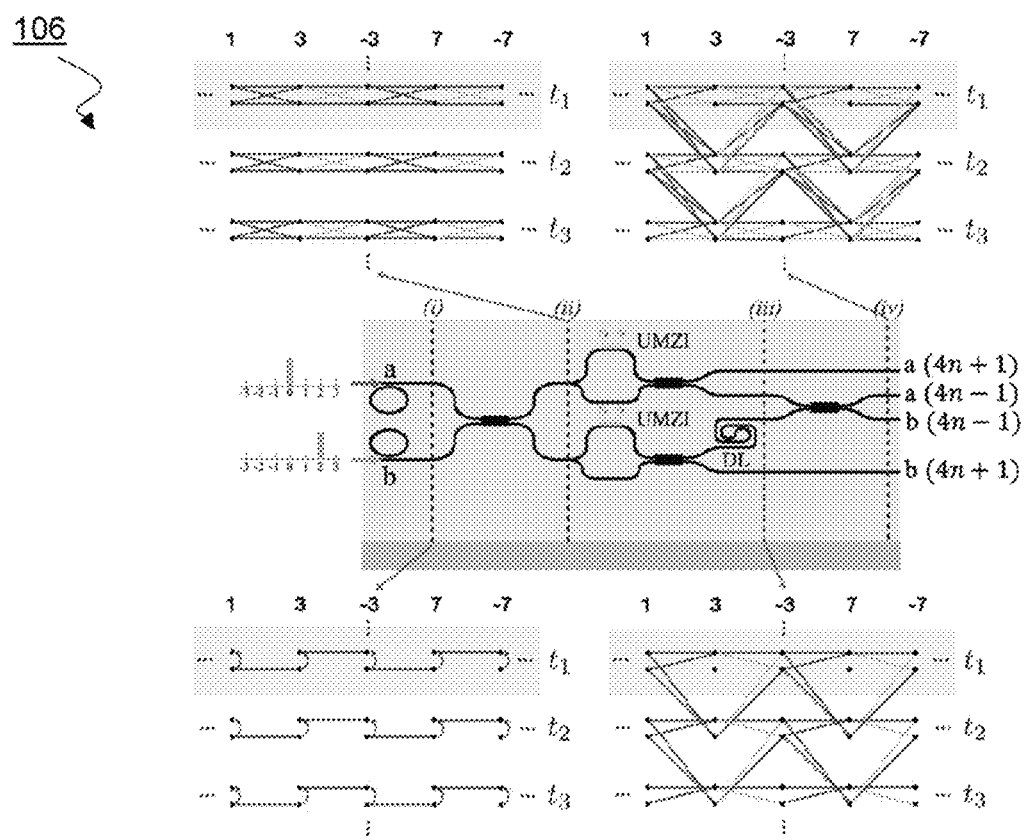
FIG. 4 illustrates frequency comb generation of a 2D cluster state.

FIG. 4 illustrates frequency comb generation of a 2D cluster state 106. By extending the setup from the 1D case by including an additional unbalanced Mach-Zehnder interferometer (UMZI), delay line (DL) and one 50:50 IBS, a 2D universal CV cluster state, known as the bilayer square lattice, can be generated. The large MR bandwidth allows for a shorter delay line that can be integrated on a photonic chip. Stage (i) and (ii) in FIG. 4 are the same as in FIG. 3. After stage (ii), the four ports are processed by an UMZI. The length difference between the two arms of UMZI is specially designed so that the spectral modes l=4n+1 are spatially separated from the spectral modes l=4n−1, where n ∈ ℤ. The UMZIs are fine-tuned using electrodes via the thermal-optical effect.

As shown in FIG. 4, the temporal modes $t_1$, $t_2$, $t_3$ ∈T, where $t_2=t_1+\delta t$ and $t_3=t_2+\delta t$ and $\delta t$ is the time delay due to the DL. For stages (i)-(iv), (ii), (iii), and (iv), C=1, ½, and ½√2, respectively. The labels a (4n+1), a (4n−1), b (4n+1) and b (4n−1) indicate the spatial mode indices ('α' and 'b').

After stage (ii), the field in one arm is temporally delayed. This arrangement extends the spectral entanglement across modes with different temporal indices. The state after stage (iii) is shown in FIG. 4. In stage (iv), the middle two arms are mixed by another 50:50 IBS, generating a 2D CV cluster state. A closely related CV cluster state was recently generated in the time domain using a long DL.

Figure 5:
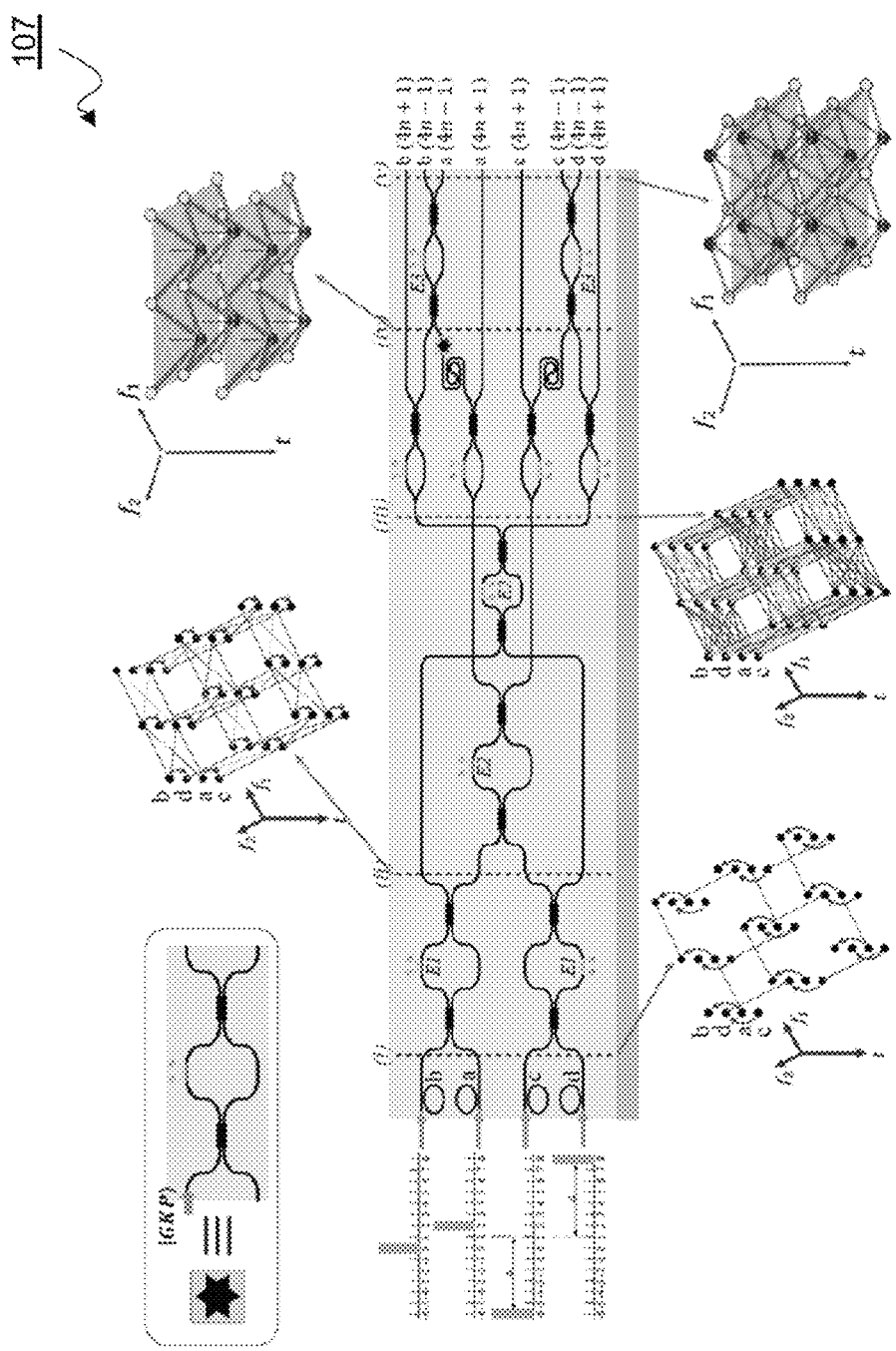
FIG. 5 illustrates frequency comb generation of a 3D cluster state.

FIG. 5 illustrates frequency comb generation of a 3D CV cluster state 107. As shown in FIG. 5, two copies of the 2D cluster state setup are used, but all the 50:50 IBSs are replaced by balanced Mach-Zehnder interferometers (BMZIs). The Mach-Zehnder interferometers are tuned to act as a 50:50 IBS. However, the Mach-Zehnder interferometers can be tuned in order to make CV cluster states with the same chip discussed more fully below. These two copies are coupled together with two additional BMZIs at stage (ii) in FIG. 5. Spatial modes {a, b, c, d} are pumped at spectral mode l=0, 2, 1+Δ, 1−Δ, respectively, where Δ∈{2n+1, n ∈ ℕ} is a free parameter that sets the length of one lattice direction in frequency, as described below. At stage (i), the state consists of a collection of entangled pairs. At stage (ii), each mode has passed through a BMZI, resulting in a collection of dual-rail wire graphs, just like in the 1D case. At stage (iii), two additional BMZIs stitch these wires together to create a 2D square lattice embedded on a cylinder with circumference A and length determined by the overall bandwidth. This state is referred to as the quad-rail lattice. At stage (iv), one quarter of the modes are delayed by one time step. This is analogous to the use of DL in 2D case. The result is the 3D CV cluster state shown in FIG. 5 and further elaborated in FIG. 6. Finally, two additional 50:50 IBSs are applied on four of the resulting fields. This is a (frequency)×(frequency)×(time) lattice. Single mode input states, such as GKP ancilla states, can be injected into the cluster state by an input port indicated on the chip in FIG. 5. Use of such states may be for universal fault-tolerant quantum computation. The 3D structure of the cluster state becomes apparent when the modes are combined into groups of four, referred to as "macronodes".

Figure 6:
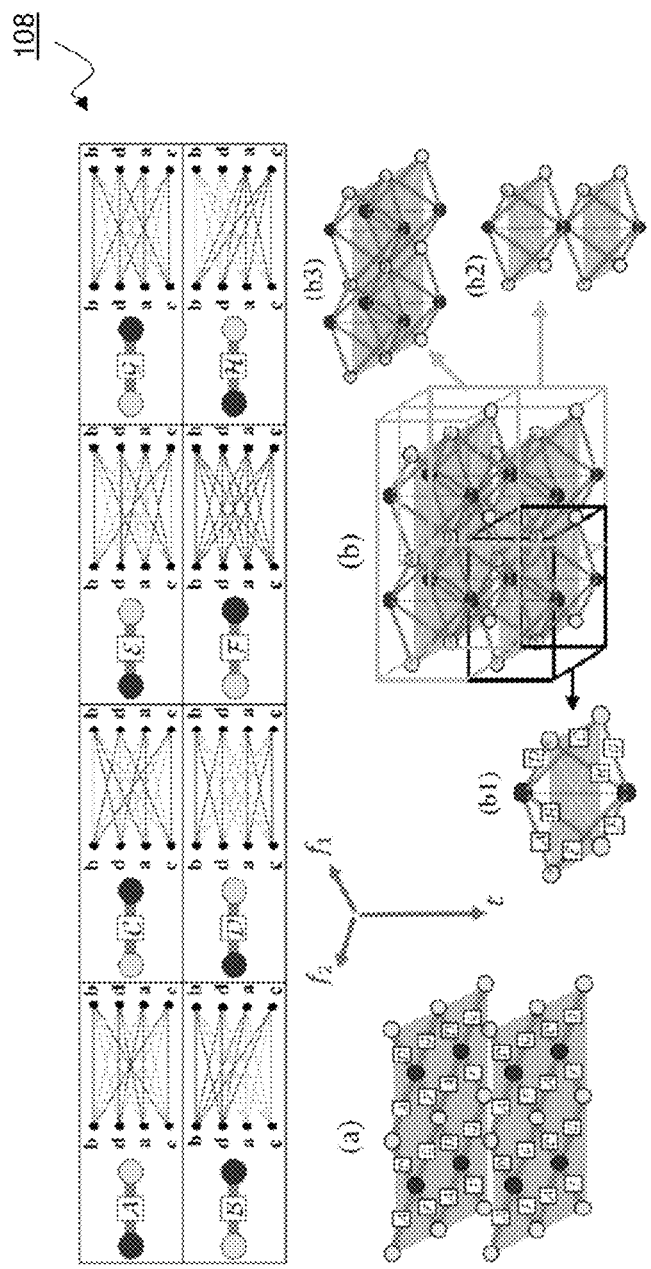
FIG. 6 illustrates macronodes.
Figure 6:
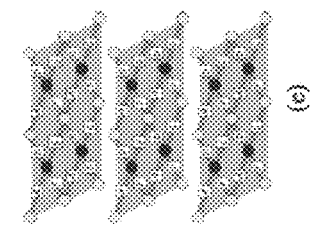

FIG. 6 illustrates macronodes 108. Each edge is labelled corresponding to the legend shown at the top. In FIG. 6, "(a)" shows that the single sheet is equivalent to the graph state at stage (iii), where multiple copies of the quad rail lattice cluster state multiplexed in time. The 3D cluster state at stage (v) is shown by "(b)", "(b1)" shows the unit cell of the 3D cluster state, "(b2)" shows the single space-like slice of the 3D cluster state, and "(b3)" shows the single time-like slice of the 3D cluster state.

Besides the 3D CV cluster state, the chip proposed in FIG. 5 is able to generate CV cluster states of any dimension from 0D to 3D by controlling phase shifts via the electrodes, E1, E2, and E3 in FIG. 5. These electrode control the relative phases between the two arms of BMZIs such that the splitting ratios are tuned. First, 0D cluster states, i.e., a collection of pairwise entangled states, can be generated by setting the splitting ratios of all BMZIs to be 100:0.

Figure 7:
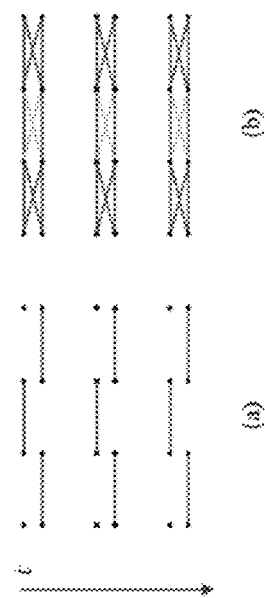
FIG. 7 illustrated cluster state arrays.

FIG. 7 illustrated cluster state arrays 109. An array of two-mode DV cluster states is show by "(a)" in FIG. 7. To make many copies of 1D entangled states in frequency as shown by "(b)", one tunes the splitting ratios of the BMZIs at E1, 50:50, and the BMZIs at E2 and E3, 100:0. In order to make two copies of 2D cluster states as shown by "(c)", one sets the splitting ratios of the BMZIs at E2, 100:0 (rather than 50:50) and modifies the BMZIs at E1, and E3, 50:50. These 2D cluster states are (frequency)×(time) lattices. The (frequency)×(time) mode analog of the 2D cluster state is shown by "(d)" in FIG. 7. This can be generated by setting the splitting ratio of the BMZIs at E3, 100:0. Finally, if the BMZIs at E2 are tuned to be 50:50, then a train of uncoupled (frequency)×(frequency) quad-rail lattices can be created as shown by "(e)".

Measuring expectation values of nullifiers plays a key role in verifying Gaussian pure states and genuine multipartite inseparability, e.g., via the van Loock-Furusawa criterion. Particularly convenient are states which have nullifiers that can be re-expressed such that each only consists of either position or momentum operators. These enable particularly efficient state verification since they can be measured by setting all homodyne detectors to measure either the local position or momentum operator. Any state prepared from two-mode squeezed states and beamsplitters that do not mix position and momentum quadratures in the Heisenberg picture has nullifiers of this type.

Bulk quantum-optics platforms have successfully demonstrated the generation of large-scale CV cluster states. Silicon photonics is a preferred scalable platform for mass integration of hundreds of devices on a single chip for classical optical communication, which fulfills long-term stability, cost, portability, and mass productivity.

Critically, quantum information processing in silicon photonics is carried out in the telecommunication band, and is thereby compatible with mature modulation, trans-mission, and detection technologies. Silicon, however, is not an ideal material for quantum information processing based on CVs due to its strong two-photon absorption in the telecommunication band, which precludes the generation of, e.g., highly squeezed light.

Hence, silicon nitride ($Si_3N_4$) is most preferred and shows superiority. As a well-developed commercially-available material, silicon nitride has been widely used in both microelectronic and optical integrated circuits. And its compatibility with the mature CMOS fabrication technology makes the silicon nitride platform stable, high performance, and cost effective. Unlike silicon, silicon nitride ultrabroad transparency window spanning from the visible to the mid-infrared makes it immune to two-photon absorption in the telecommunication band. In addition, the silicon nitride platform enjoys three key features that render it ideal for CV quantum information processing. First, its nonlinearity is about 20 times lower than that of silicon but the nonlinear interactions can be enhanced in ring resonators, as demonstrated in the generation of twin beams and entangled states. Second, the silicon nitride platform enjoys an additional advantage in measuring frequency-multiplexed CV cluster states over the bulk quantum-optics platform based on the second-order nonlinearity: a phase-coherent soliton frequency comb produced via the third-order Kerr nonlinearity of silicon nitride allows for simultaneous addressing of all spectral modes of the CV cluster state. Third, as a critical ingredient for time-multiplexed CV cluster states, long DLs of a few meters and an ultra-low loss level (0.1 dB/m) have been demonstrated in the silicon nitride platform, representing a nearly two orders of magnitude improvement over that of silicon-based DLs.

The details and description of the architectural analysis is described in "Quantum Computing with Multidimensional Continuous-variable Cluster States in a Scalable Photonic Platform", published May 8, 2020 by the American Physical Society, the entirety of which is incorporated by reference.

A brief review on the generation mechanism for Kerr-soliton frequency combs is now provided. The Kerr-soliton frequency combs are subsequently used as phase references to address each spectral mode of the CV cluster state.

A microring resonator with a circumference L is considered. In the absence of optical nonlinearities and dispersion, the resonant frequency of the cavity eigenmodes are equally spaced across the whole spectrum. The Kerr effect is a third-order nonlinear phenomenon that manifests itself as an intensity-dependent refractive index. It is noted that to study the nonlinear interactions in a MR, it is more convenient to define a nonlinear coefficient. Specifically, the shift of the resonant frequency induced by a single pump photon is quantified. The resonant frequency for the pump is shifted relative to a cold cavity by self-phase modulation. The presence of intra cavity pump power also shifts the resonant frequencies of other cavity-resonant modes via cross-phase modulation. The magnitude of cross-phase modulation is twice that of self-phase modulation, thereby leading to a doubled shift for other resonant frequencies aside from the pump.

To employ MRs in broadband applications such as the generation of Kerr-soliton frequency combs or largescale frequency-multiplexed CV cluster states, the frequency dependence of refractive index must be accounted for. A strong pump and anomalous dispersion shifts the resonant frequencies. The overall frequency shift is balanced to ensure that a large number of spectral modes reside approximately on the cavity resonances, which is a key to achieving efficient Kerr-soliton and CV cluster-state generation.

Kerr-soliton frequency combs serve as phase reference for the CV cluster states. Spectral linewidth, which describes the total power decay rate, accounts for the intrinsic cavity loss and the output-coupling loss. Also represented is pump detuning away from pump frequency along with intracavity power decay, resonant frequency shift due to dispersion, the nonlinear Kerr interactions between different cavity modes, including self-phase modulation, cross-phase modulation, and FWM, and the link between the extracavity pump with the intracavity field. The coupled-mode equations represent a frequency-domain approach in which the evolution of each spectral mode is derived.

Figure 8:
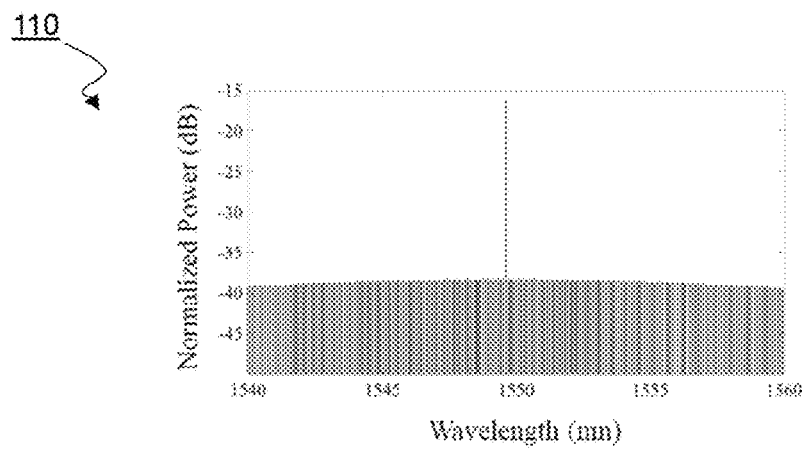
FIG. 8 illustrates a spectrum of a stable Kerr-soliton frequency comb.

To produce Kerr-soliton frequency combs, the MR is pumped above its oscillating threshold by a CW pump with a certain power level and an initial normalized pump detuning value. Subsequently, the pump detuning is adjusted when a stable Kerr-soliton is observed. FIG. 8 illustrates a spectrum 110 of a stable Kerr-soliton frequency comb. Each frequency tooth can serve as a pump or a phase reference that addresses a corresponding spectral mode in the CV cluster state.

To study the quantum dynamics, in particular, the formation of entanglement between different spectral modes, the classical coupled-mode equations are augmented with quantum field operators. It is convenient to derive the spectrum of the quantum field operators. The intracavity field is coupled out to the bus waveguide to form the output-coupling field residing in the bus waveguide, which can be directly measured and characterized.

The introduction of IBSs, DLs and waveguide crossings causes attenuation on the power of the extracavity quantum fields; To account for the power attenuation, an attenuated quantum-field operator is introduced and nullifiers for verifying the multipartite inseparability of the 0D, 1D, 2D, and 3D CV cluster states can be derived.

In the 0D case, the output quantum fields form pair-wise two-mode squeezed states between mode 1 and −1 with the nullifiers. To generate 1D cluster states, two 0D cluster states produced at spatial modes are prepared. The two 0D cluster states are subsequently mixed through a 50:50 IBS (see FIG. 3). In passing through the 50:50 IBS, quantum fields are linearly processed, leading to the nullifiers with sub-indices denoting "spatial mode" and "spectral mode". To generate 2D CV cluster states, 1D cluster states are processed by linear optics. With the introduction of the DL, the quantum-field operators acquire an additional index, i.e., time. The number of temporal modes is determined by the amount of execution time. The DL spreads the momentary entanglement to a series of entangled temporal modes with spacing $\delta t$. The generation of 2D cluster states requires two 50:50 IBSs, one UMZI, and one DL.

To generate 3D CV cluster states, two sets of the 2D cluster state setup are replicated and the output fields are processed based on the structure illustrated in FIG. 5. At each time step, the state consists of a 2D entangled structure, with axes f1 and f2 made by appropriate frequency multiplexing. To achieve this, four input pump spectral modes are chose with a total number of spectral modes determined by the phase-matching bandwidth, and the total number of frequency indices are split between the two lattice axes f1 and f2. To take into account the effects of dispersion, the cross-section of each MR is modeled as a rectangle with width W and height H. Tuning the aspect ratio W/H provides different dispersion parameters, which in turn determine the dimensions of the cluster state.

To generate large-scale CV cluster states, several identical MRs are prepared—2 MRs for the 1D and 2D cases, and 4 MRs for the 3D case. However, fabricating several effectively identical MRs poses an engineering challenge. Fabrication errors may, for example, result in variations in the FSR of each MR and ultimately a reduction in the quality of the output CV cluster states. One way to overcome this problem is to sandwich each MR by two parallel bus waveguides. Then, a pair of pump fields from each bus waveguides are sent in counter-propagating directions so that they are into the same MR base. This allows for the FSRs of the MRs to be matched by the thermo-optical fine tuning.

With details provided for how to generate 0D, 1D, 2D, and 3D CV cluster states, now described are how such states can be used for one-way quantum computing.

Implementing one-way quantum computing requires homodyne measurements of each spectral-temporal mode of the CV cluster state. The local oscillators required for homodyne detection can be generated via classical frequency combs from a supplementary MR system. The supplementary MR is pumped above threshold to experimentally realize optical soliton generation by choosing the physical parameters. The frequency teeth of the generated optical are coherent, nearly equidistant from each other, and can be a new source of classical fields or serve as multiple phase references. To implement independently tunable homodyne detection on multiple spectral modes, the relative phase of each tooth must be variable. This can be implemented using a wave-shaper.

The 0D case is not sufficiently connected for use in one-way quantum computing. The 1D case is a resource for single-mode one-way quantum computing. The 2D case is a universal resource, and can implement multimode gates via the one-way quantum-computing protocol.

A one-way quantum-computing protocol for the 3D resource state is provided. This protocol is capable of implementing local quantum circuits in (2+1) dimensions, which improves quantum circuit compilation relative to 2D resources.

For the procedure described below, it is assumed that the phase delays have already been implemented, and thus, the states described are CV cluster states.

To construct a model for one-way quantum computing using the 3D cluster state, the relevant modes are defined that the CV cluster state is made from (in terms of the infinitesimal spectral modes). Useful gates are also defined to construct the measurement-based protocol.

A square cluster state plays a key role in the analysis of the one-way quantum-computing protocol. It can be generated by sending one mode from each of a pair of two-mode CV cluster states through a 50:50 BSG.

Figure 9:
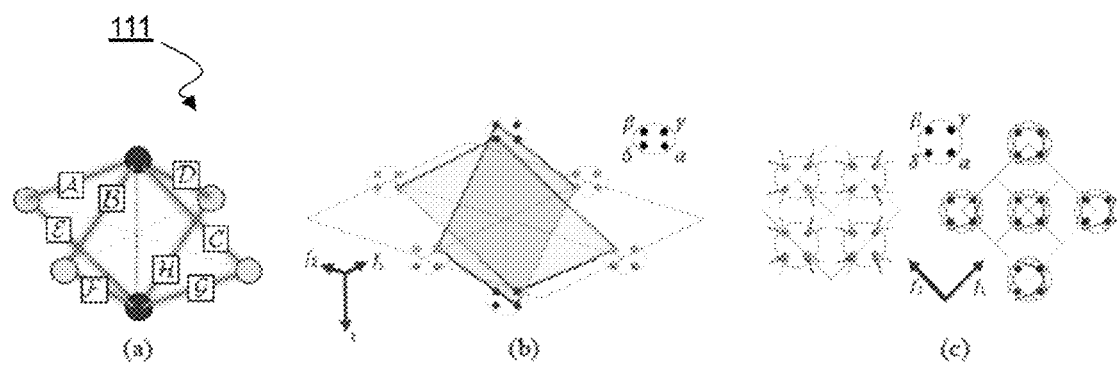
FIG. 9 illustrates a collection of square cluster states.

The description of one-way quantum computing can be simplified by expressing it in terms of so-called distributed modes, which defines a nonlocal tensor product structure for each macronode. Each of the physical modes {a, b, c, d} within a given macronode is mapped to a distinct distributed mode {α, β, γ, δ}. Expressing the 3D cluster state in terms of the distributed modes simplifies the graph substantially. It becomes a disjoint collection of square cluster states Ill as shown in FIG. 9.

Input states are encoded into half of the macronodes of a given time step (see FIG. 5). Certain macronodes serve as "routers" that control the application of entangling gates as the inputs distribute through the cluster state in the time direction. Besides simplifying the graph, the distributed modes play a special role in defining how each input is encoded within a given macronode on a given time slice. More concretely, each input is encoded into either the 'α' or the 'γ' distributed mode. In fact, it may be convenient to change whether the input resides in either the 'α' or 'γ' mode from time step to time step.

According to the invention, the protocol for one-way quantum computing involves local homodyne measurements with respect to the physical modes. Local measurements 112 on the physical modes shown by "(a)" of FIG. 10 translate to quantum gates followed by local measurements on the distributed modes shown by (b)". However, for special choices of the measurement angles, this measurement can appear as partially separable as shown by "(c)" or completely separable as shown by "(d)".

Given an input, a two-mode CV cluster state, and a measurement that implements a 50:50 BSG followed by local homodyne detection a gate may be implemented via teleportation, with infinite squeezing assumed. The teleportation-induced gate ($\hat{V}$) is a key ingredient for the one-way quantum-computing protocol. Measurements on the macronodes in "(b)" of FIG. 9 are considered with each macronode measured as shown by "(a)" and "(b)" of FIG. 10. Measurements may also be modeled as shown by "(c)" of FIG. 10.

Figure 10:
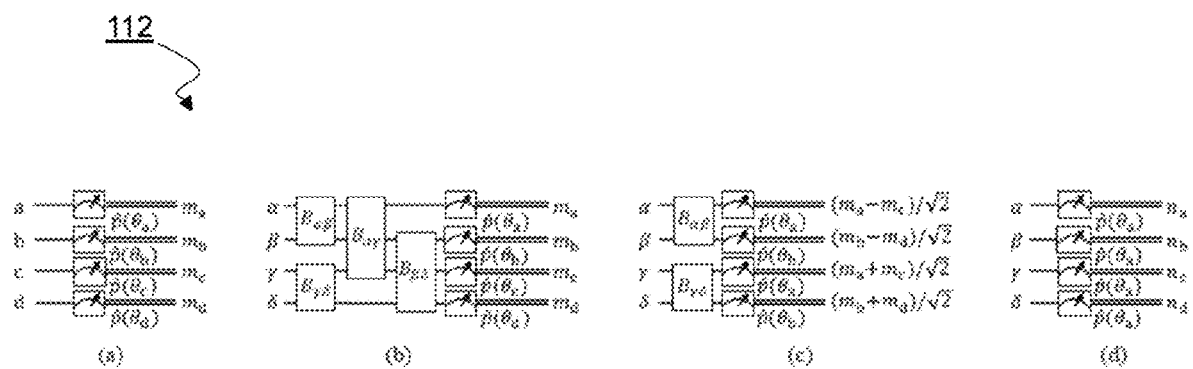
FIG. 10 illustrates local measurements on distributed modes.
Figure 11:
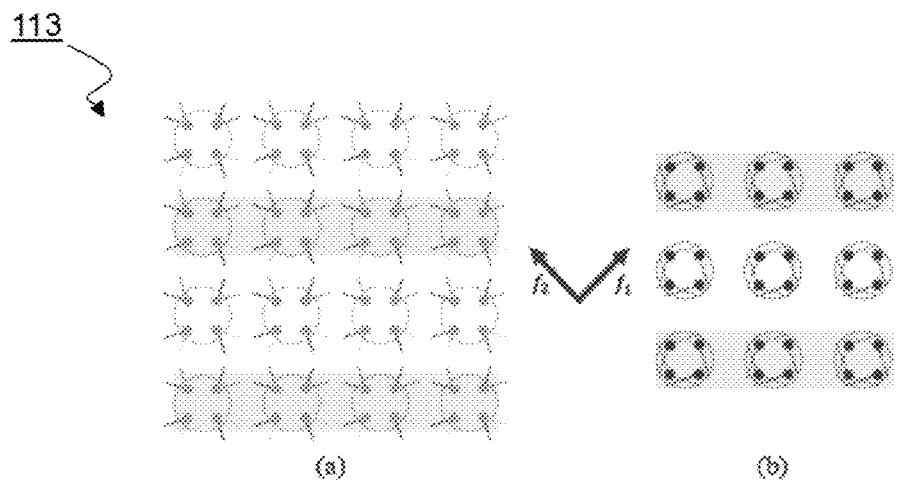
FIG. 11 illustrates macronode measurements.

Setting $\theta a=\theta c$, and $\theta b=\theta d$, the measurement can be modelled as shown by "(c)" of FIG. 10. Subsequently, certain macronodes are chosen to be measured where the sign of the measurement is determined with respect to "(a)" shown in FIG. 11, which illustrates macronode measurements 113. Since each mode within a given macronode is measured in the same basis, measurement of the physical modes can be modelled as shown by "(d)" in FIG. 10. The overall measurement pattern can now be summarized as shown by "(a)" of FIG. 12, which illustrates square graphs 114.

Figure 12:
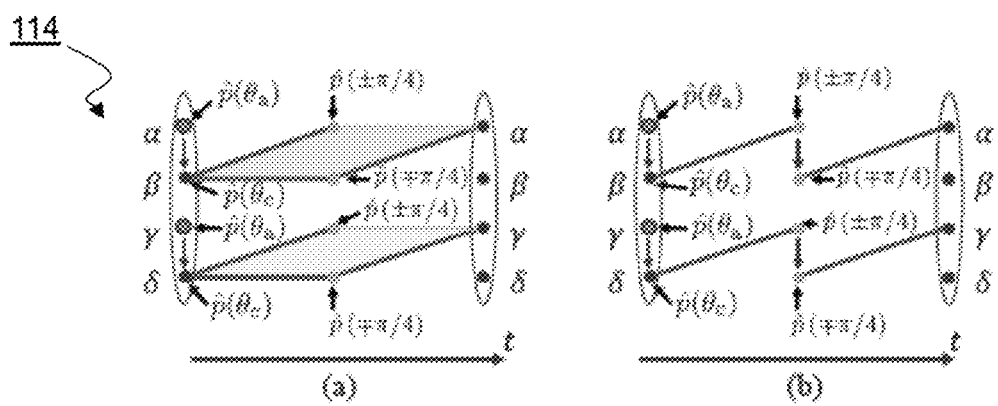
FIG. 12 illustrates square graphs.

Equivalently, the description of "(b)" of FIG. 12, which shows more clearly that this measurement pattern implements two rounds of teleportation. Thus, the ± sign of the gate implemented depends on whether the macronode is within a shaded region or an unshaded region as shown by "(b)" in FIG. 11, respectively. Note that after teleportation, the input resides in the bottom macronode "(b)" of FIG. 9. Two successive rounds of this measurement pattern are sufficient to implement arbitrary single-mode Gaussian unitary gates for inputs in either the 'α' or 'γ' distributed modes.

Another important measurement-based operation for our one-way quantum computing protocol is a swap between modes 'α' or 'γ', thus changing the distributed mode in which the logical information resides. A swap before a macronode measurement is equivalent to permuting the homodyne angles and post-processing. By swapping between the 'α' or 'γ' modes, the BMZI in FIG. 5 can be used to insert an input state, such as a GKP ancilla state, into either distributed mode of any macronode in the cluster state.

Figure 13:
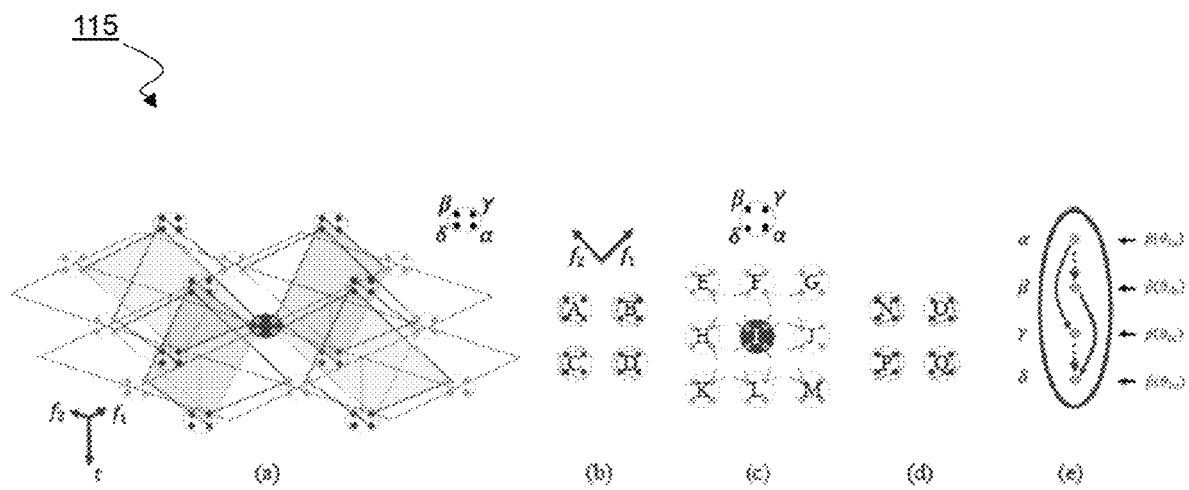
FIG. 13 illustrates a 3D cluster state represented using distributed modes.

Multimode (a.k.a. entangling) gates may be implemented between inputs encoded within adjacent macronodes. Considering four macronodes adjacent to a particular macronode, in order to perform an entangling operation between any subset of the inputs on these four macronodes, the only change relative to the single-mode gates described above is that modes that make up the central macronode are measured in different bases. For concreteness, a particular subgraph of the 3D cluster state 115 as shown in FIG. 13 is considered.

Assuming a particular macronode is used to implement entangling gates, then none of the adjacent macronodes are used to do so as well. In order for inputs in macronodes 'A' and 'D' ('B' and 'C') to participate in the entangling gate, they are assumed to reside in the 'α' or 'γ' distributed mode. If the input happened to be in the other of the two distributed modes, a swap can be employed.

Excepting special cases such as those mentioned in "(b)" and "(c)" of FIG. 10, generic angles result in measurements as shown in "(b)" of FIG. 10. The 50:50 BSGs acting before the measurement device in "(b)" of FIG. 10 are represented graphically in "(e)" of FIG. 13. By employing a series of identities for 50:50 BSGs acting on entangled pairs, the BSGs can be moved so that they act on other modes, thereby reducing the measurement on macronode 'I' to one that is local with respect to the distributed mode tensor product structure. This technique is referred to as beamsplitter gymnastics.

It is possible to implement either two or four mode entangling gates between nearest neighbor input states.

Universal quantum computing and error correction against finite squeezing effects is briefly discussed. Using finitely squeezed continuous-variable cluster states results in Gaussian noise, the strength of which is set by the available amount of squeezing in the cluster state. This effect can be combated using non-Gaussian quantum error correction, such as a supply of GKP qubits, provided that the squeezing in the CV cluster state is sufficiently high.

A non-Gaussian resource is also required to extend the above one-way quantum-computing protocol—which can only implement Gaussian unitary gates—to a universal model. With the access to a supply of GKP qubits, all of the necessary ingredients for universal quantum computing with Gaussian operations can be generated. In principle, all required Gaussian operations can be implemented using the 3D cluster state with homodyne detection via the gate set described above. Though implementing these gates on the 3D cluster state may additionally introduce Gaussian noise that arises due to having only finite squeezing, this can be corrected by using additional GKP ancilla states injected into the state at regular intervals.

Figure 14:
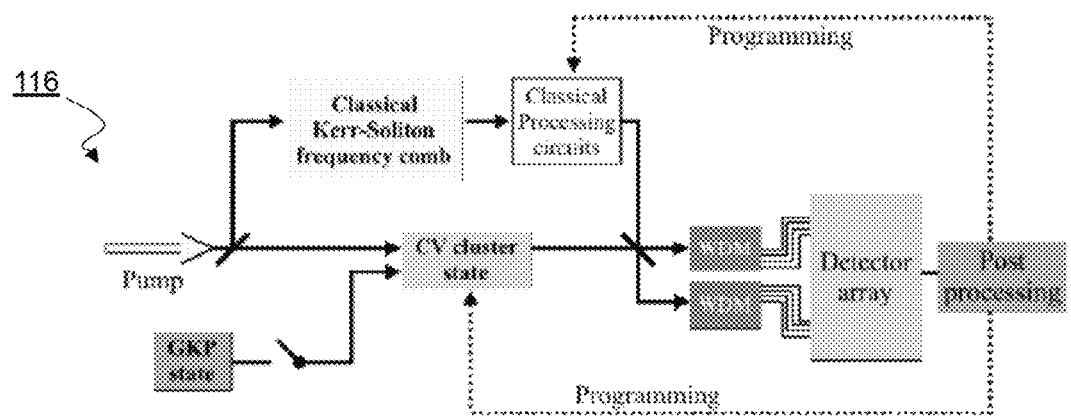
FIG. 14 illustrates integrated photonic one-way quantum computing.

All the ingredients introduced above, in conjunction with classical control, yields a universal architecture for quantum computing, as sketched in FIG. 14. FIG. 14 illustrates integrated photonic one-way quantum computing 116. The quantum MRs and linear optical components are configured to generate a 3D CV cluster state described above. To implement Gaussian quantum gates, homodyne measurements (with fully tunable and independent local oscillator phases) are performed simultaneously on all spectral modes and sequentially on all temporal modes. To do so, a classical Kerr-Soliton frequency comb is shaped by classical processing circuits so that each frequency tooth carries a designated phase to address its corresponding quantum spectral mode. The processed classical frequency comb interferes with the 3D cluster state at a 50:50 beam splitters, whose outputs are frequency demultiplexed by wavelength-division multiplexers (WDMs). An array of detectors perform balanced measurements. The measurement outcome is processed by a classical algorithm that determines the basis settings for homodyne measurements on the next batch of temporal modes. The key components of the proposed integrated silicon nitride quantum computing platform include on-chip MRs, waveguides, MMIs, crossings, and DLs.

A scalable platform for generating time frequency multiplexed CV cluster states is provided as well as utilizing them for large-scale quantum computing such as in integrated photonic circuits.

A description of the invention be found described in Quantum Computing with Multidimensional Continuous-variable Cluster States in a Scalable Photonic Platform, published May 8, 2020 by the American Physical Society, the entirety of which is incorporated by reference.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

The invention claimed is:

1. A method for generating classical frequency-comb phase references comprising the steps of:
sending a continuous-wave pump field through a bus waveguide and coupled into a microring resonator (MR);
enhancing power of an in-coupled field by an appropriate quality (Q) factor of the MR;
generating side-mode fields via four-wave mixing (FWM), wherein the generating step is above a parametric oscillation threshold;
creating more side-mode fields via stimulated FWM by coupling the generated side-mode fields with the continuous-wave pump field, wherein the creating step provides a spectrum profile;
locking a phase of each frequency tooth of the spectrum profile to generate a Kerr-soliton microcomb;
using the Kerr-solution microcomb as a phase reference for a continuous-variable (CV) cluster state in coherent quantum measurements; and
generating a 3D continuous-variable (CV) cluster state for fault-tolerant quantum computing.

2. The method according to claim 1, wherein the continuous-wave pump field is two or more continuous-wave pump fields.

3. The method according to claim 2, wherein the two or more continuous-wave pump fields is four continuous-wave pump fields.

4. The method of claim 1, wherein the power is below the parametric oscillation threshold.

5. The method of claim 1, wherein the side-mode fields are created in a pair-wise fashion via four-wave mixing (FWM) that couples different cavity spectral modes.

6. The method of claim 1 further comprising the step of interfering spatial and temporal degrees of freedom via a quantum circuit that consists of 10 Mach-Zehnder interferometers and two delay lines.

7. The method of claim 1 further comprising the steps of:
controlling the 3D CV cluster state by a relative phase between local oscillators and modes that make up the 3D CV cluster state; and
implementing single-mode Gaussian unitary gates.

8. The method of claim 1 further comprising the step of using silicon photonics.

9. A method for generating a continuous-variable (CV) cluster state for fault-tolerant quantum computing comprising the steps of:
providing a quantum circuit that consists of 10 Mach-Zehnder interferometers and two delay lines;
sending a continuous-wave pump field through a bus waveguide and coupled into a microring resonator (MR);
enhancing power of an in-coupled field by an appropriate quality (Q) factor of the MR;
generating side-mode fields via four-wave mixing (FWM), wherein the generating step is above a parametric oscillation threshold;

creating more side-mode fields via stimulated FWM by coupling the generated side-mode fields with the continuous-wave pump field, wherein the creating step provides a spectrum profile;

locking a phase of each frequency tooth of the spectrum profile to generate a Kerr-soliton microcomb; and using the Kerr-soliton microcomb as a phase reference for a continuous-variable (CV) cluster state in coherent quantum measurements.

\* \* \* \* \*